US008689568B2

(12) United States Patent
Kohli et al.

(10) Patent No.: US 8,689,568 B2
(45) Date of Patent: Apr. 8, 2014

(54) COOLING HOLE WITH THERMO-MECHANICAL FATIGUE RESISTANCE

(75) Inventors: Atul Kohli, Tolland, CT (US); Matthew S. Gleiner, Vernon, CT (US); Mark F. Zelesky, Bolton, CT (US); JinQuan Xu, Groton, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/544,097

(22) Filed: Jul. 9, 2012

(65) Prior Publication Data
US 2013/0205786 A1    Aug. 15, 2013

Related U.S. Application Data

(60) Provisional application No. 61/599,388, filed on Feb. 15, 2012, provisional application No. 61/599,372, filed on Feb. 15, 2012, provisional application No. 61/599,379, filed on Feb. 15, 2012.

(51) Int. Cl.
*F02C 7/12*    (2006.01)
(52) U.S. Cl.
USPC .............................. 60/806; 60/752; 415/116
(58) Field of Classification Search
USPC .................. 60/752–760, 806; 415/115–116; 416/96 R, 97 R
See application file for complete search history.

(56) References Cited

U.S. PATENT DOCUMENTS

| 4,197,443 A | 4/1980 | Sidenstick |
| 4,529,358 A | 7/1985 | Papell |
| 4,622,821 A | 11/1986 | Madden |
| 4,653,279 A | 3/1987 | Reynolds |
| 4,653,983 A | 3/1987 | Vehr |
| 4,672,727 A | 6/1987 | Field |
| 4,684,323 A | 8/1987 | Field |
| 4,700,544 A | 10/1987 | Fucci |

(Continued)

FOREIGN PATENT DOCUMENTS

| EP | 1326007 A2 | 7/2003 |
| EP | 1609949 A1 | 12/2005 |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

(Continued)

*Primary Examiner* — Phutthiwat Wongwian
(74) *Attorney, Agent, or Firm* — Kinney & Lange

(57) ABSTRACT

A gas turbine engine includes a wall having first and second wall surfaces and a cooling hole extending through the wall. The cooling hole includes an inlet located at the first wall surface, an outlet located at the second wall surface, a metering section extending downstream from the inlet and a diffusing section extending from the metering section to the outlet. The diffusing section includes a first lobe diverging longitudinally and laterally from the metering section, a second lobe diverging longitudinally and laterally from the metering section, an upstream end located at the outlet, a trailing edge located at the outlet opposite the upstream end and generally opposite first and second sidewalls. Each sidewall has an edge extending along the outlet between the upstream end and the trailing edge. Each edge diverges laterally from the upstream end and converges laterally before reaching the trailing edge.

21 Claims, 7 Drawing Sheets

(56) References Cited

U.S. PATENT DOCUMENTS

| | | |
|---|---|---|
| 4,738,588 A | 4/1988 | Field |
| 5,062,768 A | 11/1991 | Marriage |
| 5,096,379 A | 3/1992 | Stroud et al. |
| 5,129,231 A | 7/1992 | Becker et al. |
| 5,252,026 A | 10/1993 | Shepherd |
| 5,326,224 A | 7/1994 | Lee et al. |
| 5,358,374 A | 10/1994 | Correia et al. |
| 5,382,133 A | 1/1995 | Moore et al. |
| 5,418,345 A | 5/1995 | Adamski |
| 5,419,681 A | 5/1995 | Lee |
| 5,609,779 A | 3/1997 | Crow et al. |
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,273,351 B2 | 9/2007 | Kopmels |
| 7,328,580 B2 | 2/2008 | Lee et al. |
| 7,374,401 B2 | 5/2008 | Lee |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 8,245,519 B1 * | 8/2012 | Liang ........................ 60/806 |
| 2001/0036401 A1 | 11/2001 | Harvey et al. |
| 2002/0159888 A1 | 10/2002 | Rinck et al. |
| 2005/0106020 A1 | 5/2005 | Bunker et al. |
| 2005/0286998 A1 | 12/2005 | Lee et al. |
| 2006/0163211 A1 | 7/2006 | Pietraszkiewicz et al. |
| 2008/0003096 A1 | 1/2008 | Kohli et al. |
| 2008/0145208 A1 | 6/2008 | Klasing et al. |
| 2009/0013695 A1 | 1/2009 | Dierberger et al. |
| 2009/0304499 A1 | 12/2009 | Strock et al. |
| 2010/0068032 A1 | 3/2010 | Liang |
| 2010/0068068 A1 | 3/2010 | Liang |
| 2010/0282721 A1 | 11/2010 | Bunker et al. |
| 2011/0097191 A1 | 4/2011 | Bunker |
| 2011/0185572 A1 | 8/2011 | Wei et al. |
| 2011/0293423 A1 | 12/2011 | Bunker et al. |
| 2012/0051941 A1 | 3/2012 | Bunker |
| 2012/0167389 A1 * | 7/2012 | Lacy et al. ............. 29/889.1 |

OTHER PUBLICATIONS

International Search Report and Written Opinion from PCT Application Serial No. PCT/US2013/025680, dated Nov. 6, 2013, 14 pages.

* cited by examiner

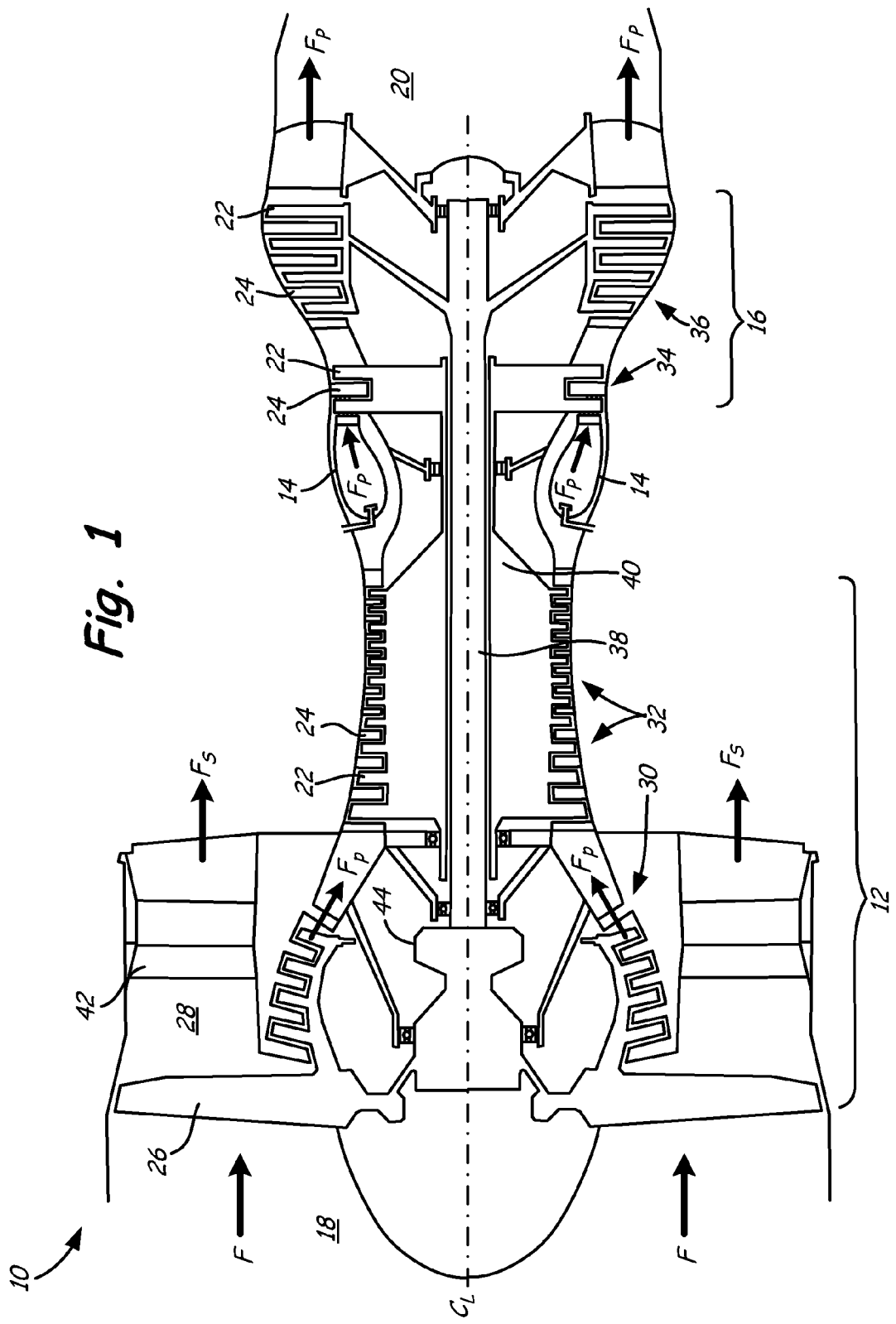

COOLING HOLE WITH THERMO-MECHANICAL FATIGUE RESISTANCE

CROSS-REFERENCE TO RELATED APPLICATIONS

This application claims priority to U.S. Provisional Application No. 61/599,388, filed on Feb. 15, 2012 and entitled "COOLING HOLE WITH THERMO-MECHANICAL FATIGUE RESISTANCE", U.S. Provisional Application No. 61/599,372, filed on Feb. 15, 2012 and entitled "MULTI-LOBED COOLING HOLE AND METHOD OF MANUFACTURE", and U.S. Provisional Application No. 61/599,379, filed on Feb. 15, 2012 and entitled "MULTI-LOBED COOLING HOLE AND METHOD OF MANUFACTURE", the disclosures of which are incorporated by reference in their entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine includes a wall having first and second wall surfaces and a cooling hole extending through the wall. The cooling hole includes an inlet located at the first wall surface, an outlet located at the second wall surface, a metering section extending downstream from the inlet and a diffusing section extending from the metering section to the outlet. The diffusing section includes a first lobe diverging longitudinally and laterally from the metering section, a second lobe diverging longitudinally and laterally from the metering section, an upstream end located at the outlet, a trailing edge opposite the upstream end and located at the outlet, a first sidewall and a second sidewall. The first sidewall has a first edge extending along the outlet between the upstream end and the trailing edge, and the first edge diverges laterally from the upstream end and converges laterally before reaching the trailing edge. The second sidewall has a second edge extending along the outlet between the upstream end and the trailing edge generally opposite the first sidewall, and the second edge diverges laterally from the upstream end and converges laterally before reaching the trailing edge.

A gas path wall of a component of a gas turbine engine includes first and second wall surfaces, an inlet located at the first wall surface, an outlet located at the second wall surface, a metering section commencing at the inlet and extending downstream from the inlet and a diffusing section extending from the metering section and terminating at the outlet. The outlet includes an upstream end, trailing edge, a first lateral edge, and a second lateral edge opposite the first lateral edge. The first lateral edge extends between the upstream end and the trailing edge. The first lateral edge diverges laterally from the upstream end and converges laterally before reaching the trailing edge. The second lateral edge extends between the upstream end and the trailing edge. The second lateral edge diverges laterally from the upstream end and converges laterally before reaching the trailing edge. The diffusing section includes first and second lobes, each diverging longitudinally and laterally from the metering section.

BRIEF DESCRIPTION OF THE DRAWINGS

FIG. 1 is a cross-sectional view of a gas turbine engine.

DETAILED DESCRIPTION

Figure 2A:
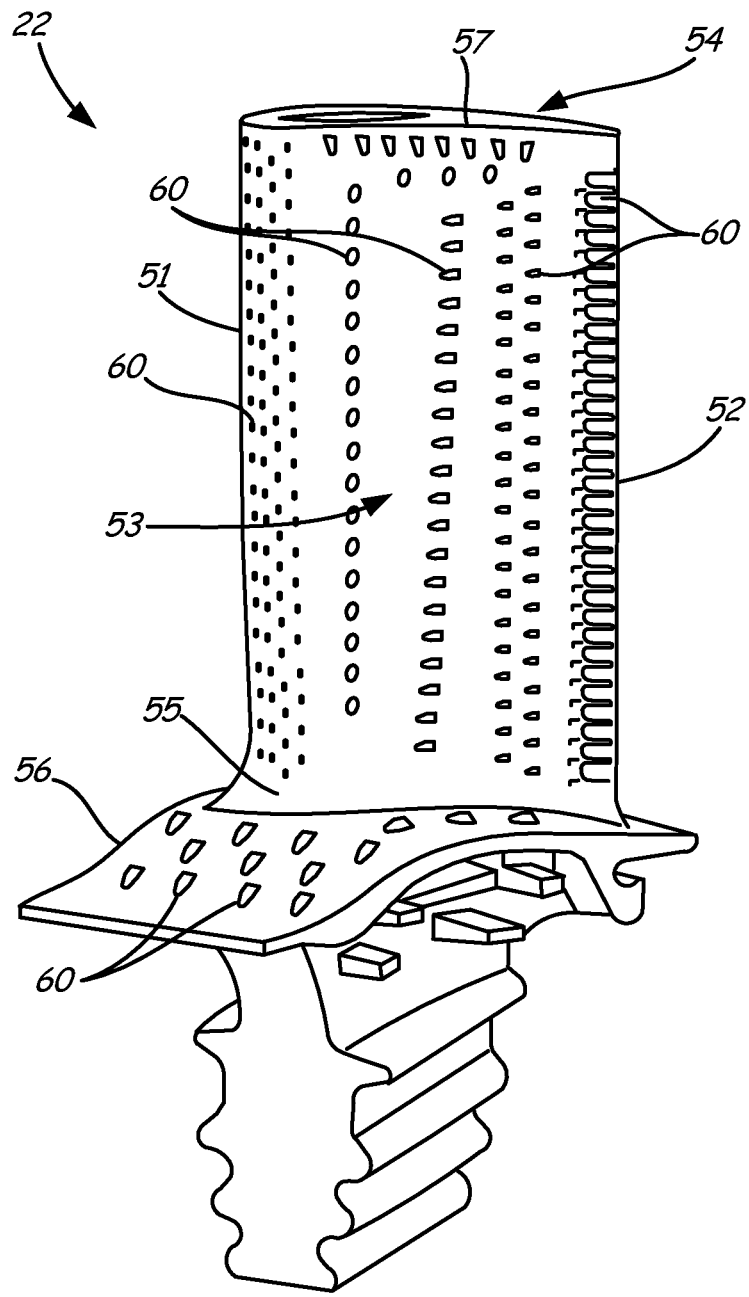
FIG. 2A is a perspective view of an airfoil for the gas turbine engine, in a rotor blade configuration.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
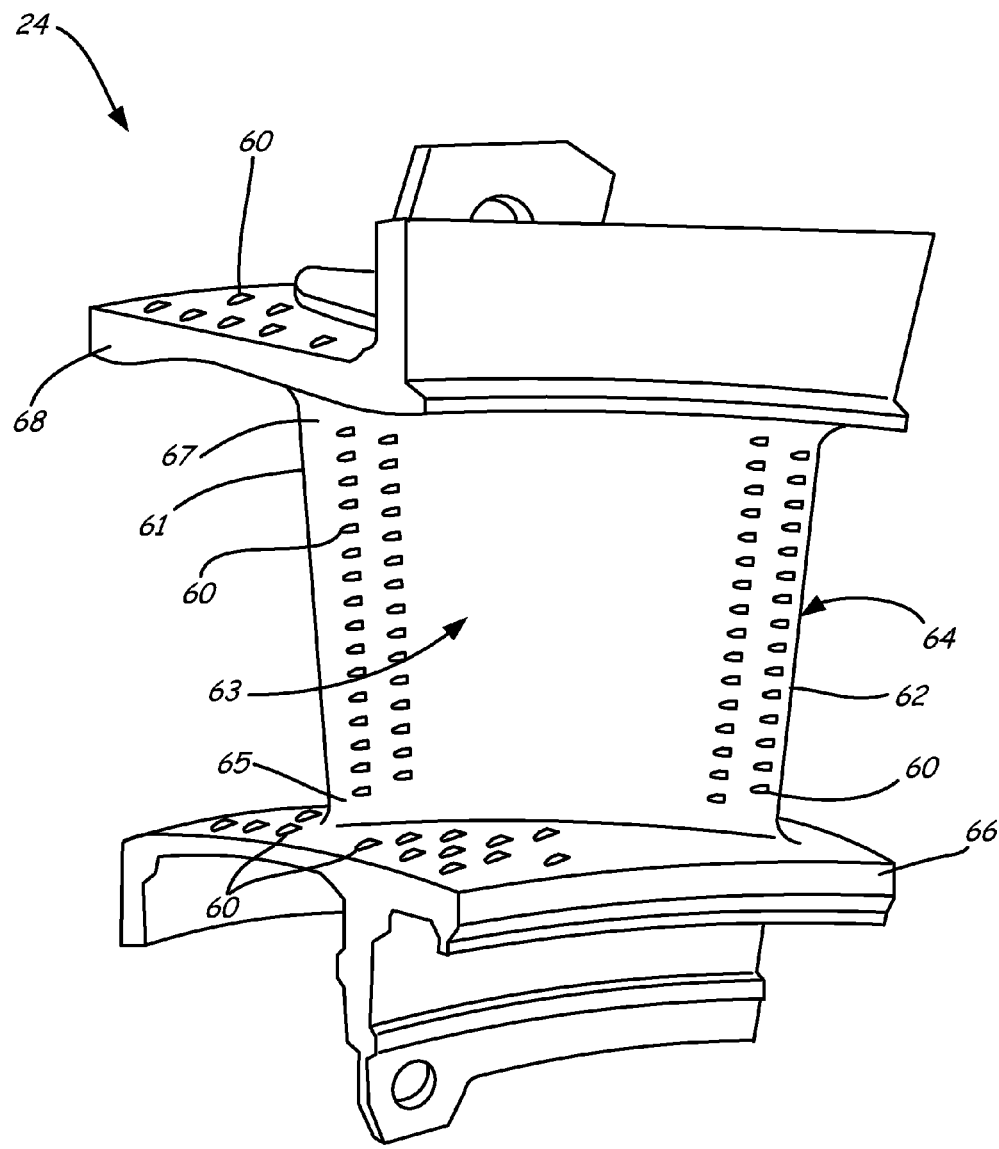
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

The cooling holes described herein provide a cooling solution that offers the improved film cooling coverage of multi-lobed cooling holes while reducing problems associated with thermo-mechanical fatigue (TMF). Some state of the art diffusion-type cooling holes are particularly susceptible to TMF. Surface cracks that form as a result of mechanical and thermal loading and unloading can affect cooling performance. The cooling holes described herein provide for more robust cooling holes that are less susceptible to the effects of TMF (e.g., cracking).

Figure 3:
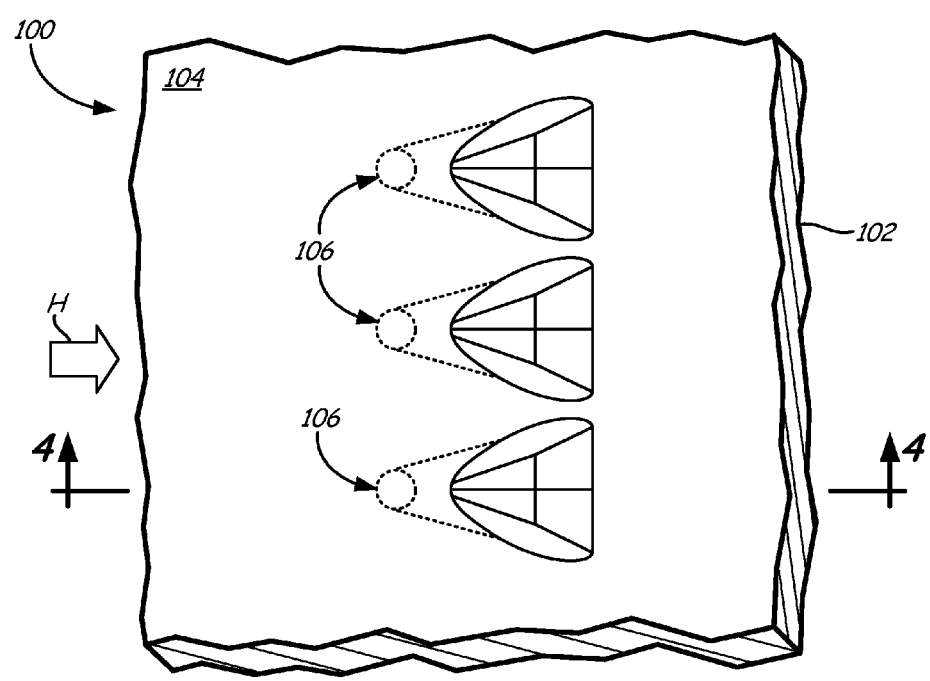
FIG. 3 is a view of a wall having multi-lobed cooling holes.

FIG. 3 illustrates a view of a wall having multi-lobed cooling holes. Wall 100 includes first wall surface 102 and second wall surface 104. As described in greater detail below, wall 100 is metallic and second wall surface 104 can include a thermal barrier coating. Cooling holes 106 are oriented so that their inlets are positioned on first wall surface 102 and their outlets are positioned on second wall surface 104. During gas turbine engine operation, second wall surface 104 is in proximity to high temperature gases (e.g., combustion gases, hot air). Cooling air is delivered inside wall 100 where it exits the interior of the component through cooling holes 106 and forms a cooling film on second wall surface 104. As shown in FIG. 3, cooling holes 106 have two lobes in the diffusing section of the cooling hole outlet on second wall surface 104.

As described below in greater detail, cooling air flows out of cooling holes 106, with cooling air flowing through each of the lobes in the diffusing section. Cooling holes 106 can be arranged in a linear row on wall 100 as shown in FIG. 3 and positioned axially so that the cooling air flows in substantially the same direction longitudinally as the hot air flowing past wall 100. In this embodiment, cooling air passing through cooling holes 106 exits cooling holes traveling in the same direction as the hot air flowing along second wall surface 104 (represented by arrow H). Here, the linear row of cooling holes 106 is perpendicular to the direction of flow H. In alternate embodiments, the orientation of cooling holes 106 can be arranged on second wall surface 104 so that the flow of cooling air is perpendicular to the hot air flow (i.e. cooling air exits cooling holes 106 radially) or at an angle between parallel and perpendicular (compound angle). Cooling holes 106 can also be provided in a staggered formation on wall 100. Cooling holes 106 can be located on a variety of components that require cooling. Suitable components include turbine vanes and blades, combustors, and blade outer air seals, etc. Cooling holes 106 can be located on the pressure side or suction side of vanes and blades. Cooling holes 106 can also be located on the blade tip or blade or vane platforms.

Figure 4:
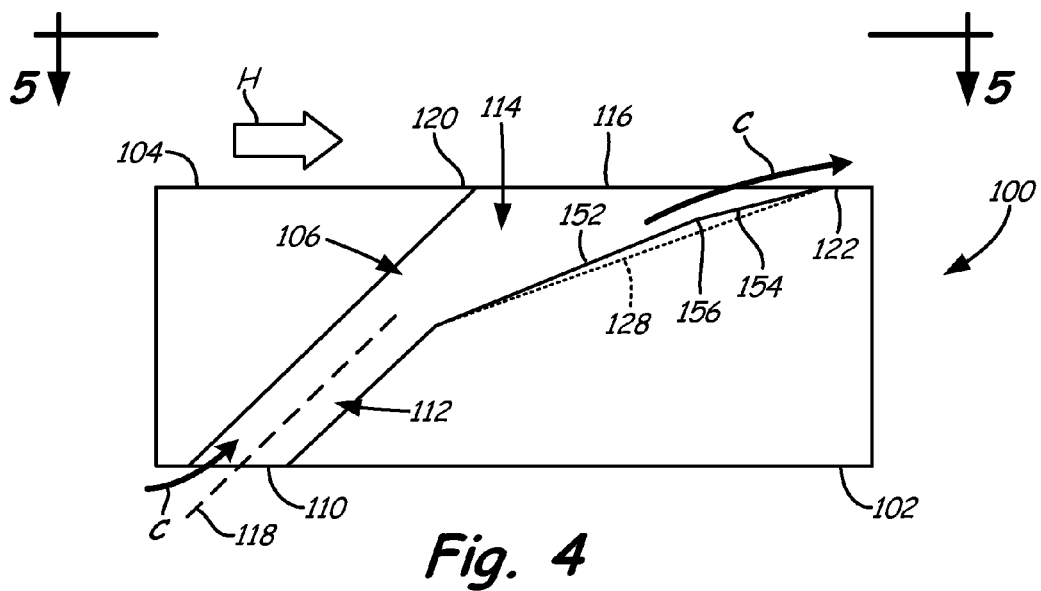
FIG. 4 is a sectional view of the multi-lobed cooling hole of FIG. 3 taken along the line 4-4.
Figure 5:
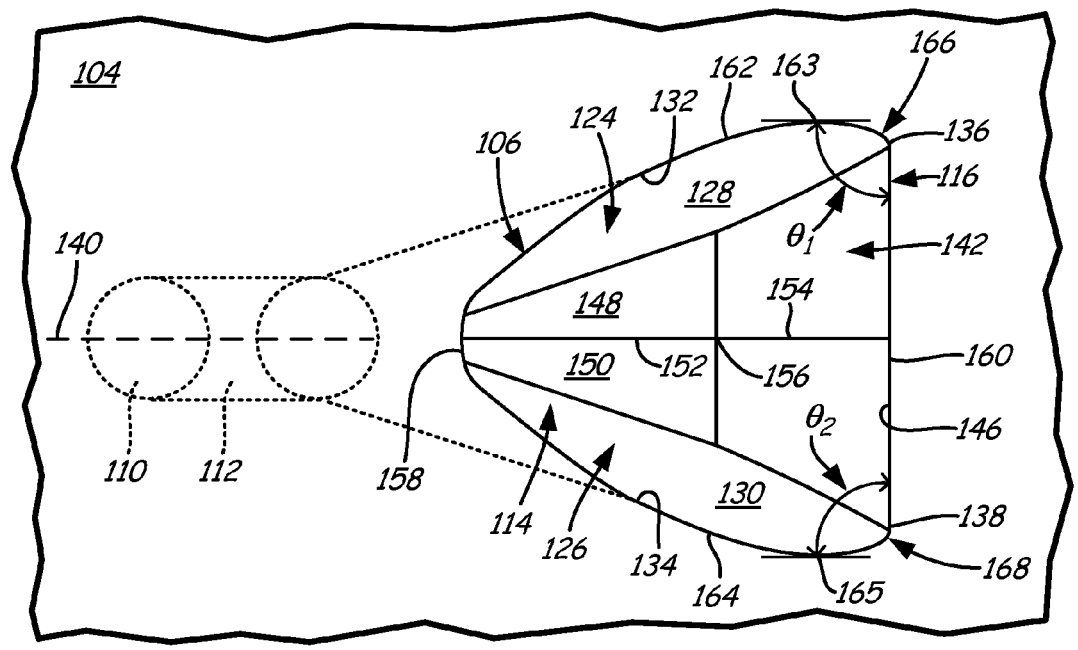
FIG. 5 is a view of the multi-lobed cooling hole of FIG. 4 taken along the line 5-5.

FIGS. 4 and 5 illustrate one embodiment of cooling hole 106 in greater detail. FIG. 4 illustrates a sectional view of multi-lobed film cooling hole 106 of FIG. 3 taken along the line 4-4. FIG. 5 illustrates a view of cooling hole 106 of FIG. 4 taken along the line 5-5. Cooling hole 106 includes inlet 110, metering section 112, diffusing section 114 and outlet 116. Inlet 110 is an opening located on first wall surface 102. Cooling air C enters cooling hole 106 through inlet 110 and passes through metering section 112 and diffusing section 114 before exiting cooling hole 106 at outlet 116 along second wall surface 104.

Metering section 112 is adjacent to and downstream from inlet 110 and controls (meters) the flow of air through cooling hole 106. In exemplary embodiments, metering section 112 has a substantially constant flow area from inlet 110 to diffusing section 114. Metering section 112 can have circular, oblong (oval or elliptical) or racetrack (oval with two parallel sides having straight portions) shaped axial cross sections. In FIGS. 4 and 5, metering section 112 has a circular cross section. Circular metering sections 112 have a length l and diameter d. In exemplary embodiments, inlet 110 and metering section 112 have the same diameter d. In some embodiments, circular metering section 112 has a length l according to the relationship: $d \leq l \leq 3$ d. That is, the length of metering section 112 is between one and three times its diameter. The length of metering section 112 can exceed 3 d, reaching upwards of 30 d. In alternate embodiments, metering section 112 has an oblong or racetrack-shaped cross section. As oblong and racetrack configurations are not circular, their metering sections 112 have a length l and hydraulic diameter $d_h$. Hydraulic diameters ($d_h$) are used to describe flow in non-circular channels. In some embodiments, metering section 112 has a length l according to the relationship: $d_h \leq l \leq 3$ $d_h$. That is, the length of metering section 112 is between one and three times its hydraulic diameter. Again, the length of metering section 112 can exceed 3 $d_h$, reaching upwards of 30 $d_h$. In exemplary embodiments, metering section 112 is inclined with respect to wall 100 as illustrated in FIG. 4 (i.e. metering section 112 is not perpendicular to wall 100). Metering section 112 has a longitudinal axis represented by numeral 118.

Diffusing section 114 is adjacent to and downstream from metering section 112. Cooling air C diffuses within diffusing section 114 before exiting cooling hole 106 at outlet 116 along second wall surface 104. Second wall surface 104 includes upstream end 120 (upstream of cooling hole 106) and downstream end 122 (downstream from cooling hole 106). Diffusing section 114 opens along second wall surface 104 between upstream end 120 and downstream end 122. As shown in FIG. 4, cooling air C diffuses away from longitudinal axis 118 in diffusing section 114 as it flows towards outlet 116.

As shown best in FIG. 5, diffusing section 114 includes two channel-like lobes 124 and 126 as described in U.S. Provisional Application No. 61/599,372, filed on Feb. 15, 2012 and entitled "MULTI-LOBED COOLING HOLE AND METHOD OF MANUFACTURE", which is incorporated by reference. Lobes 124 and 126 are surfaces of wall 100 which define the void of cooling hole 106 at diffusing section 114. Each lobe 124, 126 diverges longitudinally and laterally from metering section 112 and has a bottom surface (bottom surfaces 128 and 130, respectively), a side wall along the outer edge of diffusing section 114 (side walls 132 and 134, respectively) and a trailing edge (trailing edges 136 and 138, respectively). FIG. 4 best illustrates the longitudinal divergence (from longitudinal axis 118), while FIG. 5 best illustrates the lateral divergence (from centerline axis 140). As shown in FIG. 5, first lobe 124 laterally diverges upwards from centerline axis 136 and second lobe 126 laterally diverges downwards from centerline axis 140. Cooling air C leaving metering section 112 and entering diffusing section 114 diffuses into lobes 124 and 126, causing the cooling air to spread laterally within diffusing section 114. Side wall 132 and bottom surface 128 direct cooling air C through first lobe 124, and side wall 134 and bottom surface 130 direct cooling air C through second lobe 126.

Diffusing section 114 also includes interlobe (or transition) region 142. Portion 144 of interlobe region 142 is located between first lobe 124 and second lobe 126. End 146 of interlobe region 142 is adjacent outlet 116 where the outlet meets second wall surface 104. Portion 144, located between first lobe 124 and second lobe 126, can extend towards metering section 112 to varying degrees. The location of end 146 of interlobe region 142 relative to trailing edges 136 and 138 can also vary. In the embodiment shown in FIG. 5, end 146 meets trailing edges 136 and 138 of lobes 124 and 126, respectively at outlet 116. In this embodiment, trailing edges 136 and 138 and hence, first lobe 124 and second lobe 126, extend to outlet 116 at second wall surface 104. In other embodiments, end 146 of interlobe region 142 is spaced from trailing edges 136 and 138. In these embodiments, trailing edges 136 and 138 and hence, first lobe 124 and second lobe 126, do not extend to outlet 116 at second wall surface 104.

In the embodiment illustrated in FIG. 5, diffusing section 114 also includes first inclined portion 148 and second inclined portion 150. First inclined portion 148 is located adjacent to and extends from bottom surface 128 of first lobe 124. First inclined portion 148 extends from first lobe 124 towards centerline axis 140 and second lobe 126. Second inclined portion 150 is located adjacent to and extends from bottom surface 130 of second lobe 126. Second inclined portion 150 extends from second lobe 126 towards centerline axis 140 and first lobe 124. Depending on the location of cooling hole 106, first inclined portion 148 and second inclined portion 150 can have varying lateral and longitudinal lengths and extend from lobes 124 and 126 at various angles (inclinations). Like the side walls and bottom surfaces, first and second inclined portions 148 and 150 direct cooling air C through lobes 124 and 126 of diffusing section 114.

In some embodiments, first inclined portion 148 and second inclined portion 150 meet together to form a ridge as shown in FIG. 5. Ridge 152 is located between first lobe 124 and second lobe 126 at the intersection of first inclined portion 148 and second inclined portion 150. Ridge 152 aids in separating and directing the flow of cooling air C into first lobe 124 and second lobe 126. The location and angle of ridge 152 within diffusing section 114 can vary to direct cooling air C within diffusing section 114 to suit the location and desired flow profile of cooling hole 106.

Ridge 152 can extend longitudinally to varying degrees between metering section 112 and interlobe region 142. Ridge 152 can extend upstream all the way to metering section 112, beginning where metering section 112 and diffusing section 114 meet as shown in FIG. 4. Alternatively, ridge 152 can begin farther downstream (closer to outlet 116). Ridge 152 can extend downstream to interlobe region 142 as shown in FIG. 4. Alternatively, ridge 152 can converge with bottom surfaces 128 and 130 upstream of interlobe region 142. Corresponding changes to the longitudinal lengths of first inclined portion 148 and second inclined portion 150 must accompany any change in the longitudinal extension of ridge 152. As shown in FIG. 4, ridge 152 does not extend to outlet 116.

Interlobe (transition) region 142 (and portions 144 and 145) can take various shapes and have different configurations depending on the location and desired flow profile of cooling hole 106. The bottom surface of interlobe region 142 can be flat or curved. A curved (longitudinally convex) bottom surface of interlobe region 142 can facilitate improved flow attachment due to the Coanda effect. Interlobe region 142 can have a compound trapezoidal shape as shown in FIG. 5. In some embodiments, ridge 154 separates interlobe region 142 into two sides, each having a separate surface. Ridge 154 converges with bottom surface 130 of second lobe 126 at outlet 116 at second wall surface 104 as shown in FIG. 4. The intersection of ridges 152 and 154 at the point where interlobe region 142 meets first inclined portion 148 and second inclined portion 150 forms apex 156. By forming apex 156 upstream of outlet 116, diffusing section 114 facilitates improved flow attachment due to the Coanda effect. The location and shape of interlobe region 142 can vary so that the location of apex 156 varies between metering section 112 and outlet 116.

Outlet 116 includes upstream end 158, downstream end 160, first lateral edge 162 and second lateral edge 164. Upstream end 158 is located at the upstream end of outlet 116 near upstream end 120 of second wall surface 104. Downstream end (trailing edge) 160 is located along second wall surface 104 where end 146 (and in some embodiments, trailing edges 136 and 138) of diffusing section 114 meets second wall surface 104. First lateral edge 162 is located where side wall 132 of first lobe 124 meets second wall surface 104 and extends from upstream end 158 to downstream end 160. Second lateral edge 164 is located where side wall 134 of second lobe 126 meets second wall surface 104 and extends from upstream end 158 to downstream end 160. First and second lateral edges 162 and 164 are on opposite sides of outlet 116. As shown in FIG. 5, as first lateral edge 162 extends downstream from upstream end 148, first lateral edge 162 laterally diverges away from centerline axis 140. Before reaching downstream end 160, first lateral edge 162 converges towards centerline axis 140. First lateral edge 162 includes stationary point 163 where first lateral edge 162 is neither diverging nor converging. Similar to first lateral edge 162, as second lateral edge 164 extends downstream from upstream end 148, second lateral edge 164 laterally diverges away from centerline axis 140. Before reaching downstream end 160, second lateral edge 164 converges towards centerline axis 140. Second lateral edge 164 includes stationary point 165 where second lateral edge 164 is neither diverging nor converging.

Cooling hole 106 is less susceptible to the adverse effects of TMF due to its geometry at outlet 116. Some of the state of the art cooling holes have "sharp corners". That is, an angle formed between the cooling hole lateral edge and the trailing edge at the outlet is small. In one state of the art cooling hole, the angle between the lateral edge and the trailing edge at the hole outlet is about 50°. The trailing edge of this cooling hole is V-shaped so that the center of the trailing edge (the apex of the V) is farther upstream than the ends of the trailing edges near the lateral edges. This outlet design results in sharp corners (small angles) at the hole outlet between the lateral edges and trailing edge. These sharp corners naturally form a large temperature gradient and a stress concentration between the cooling air traveling through the cooling hole and the hot fluid flowing past the outer wall surface. As a result, these cooling holes are highly susceptible to the effects of TMF. Because of the relatively narrow angle between the side walls and the trailing edge, cracks are likely to form near the point where they intersect.

As shown in FIG. 5, cooling hole 106 is more "open" at outlet 116 than state of the art diffusion-type cooling holes where the trailing edge and sidewalls meet. Cooling hole 106 does not possess the sharp corners described above because the trailing edge (downstream end 160) does not converge upstream of first and second lobes 124 and 126. Instead, downstream end 160 is straight and extends between trailing edge 136 of first lobe 124 and trailing edge 138 of second lobe 126, forming a straight trailing edge at outlet 116. Downstream end 160 (and end 146) is even with trailing edges 136 and 138. The "openness" of outlet 116 can be described by evaluating the angles formed between the trailing edge (downstream end 160) and a line tangent to stationary points 163 and 165 of respective first and second lateral edges 162 and 164. Angle $\theta_1$ describes the angle formed between downstream end 160 and stationary point 163 of first lateral edge 162. Angle $\theta_2$ describes the angle formed between downstream end 160 and stationary point 165 of second lateral edge 164. In exemplary embodiments, angles $\theta_1$ and $\theta_2$ will be greater than about 75°. In some embodiments, angles $\theta_1$ and $\theta_2$ will be greater than about 85° or greater than or equal to about 90°. By "opening" the corners of outlet 116, the temperature gradients and stress concentrations that form near the intersection of the trailing edge and the side walls are reduced, thereby reducing the cooling hole's susceptibility to TMF and subsequent cracking.

As shown in FIG. 5, the lateral edges and the trailing edge form curved surfaces at outlet 116. First lateral edge 162 and downstream end 160 meet to form first curved portion 166. Second lateral edge 164 and downstream end 160 meet to form second curved portion 168. Having curved portions 166 and 168 instead of intersecting lines at the corners further reduces susceptibility to TMF-related cracking with additional reduction in stress concentration at the corners of outlet 116.

Figure 6:
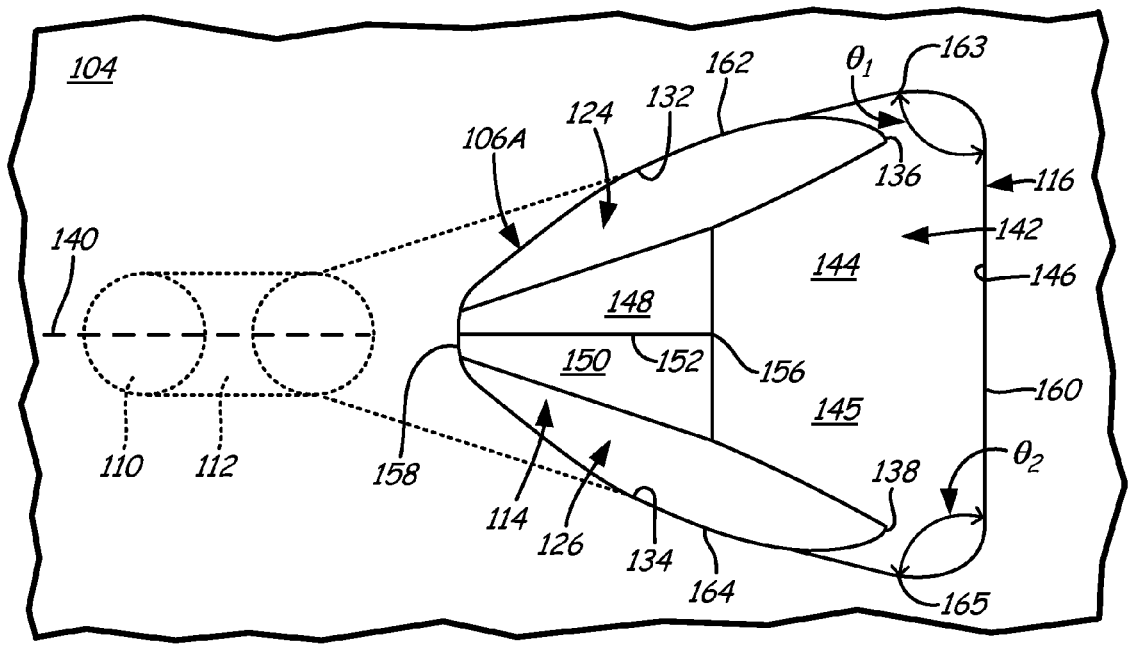
FIG. 6 is a view of another embodiment of a multi-lobed cooling hole.

As shown in FIG. 5, trailing edge 136 of first lobe 124, trailing edge 138 of second lobe 126 and end 146 of interlobe region 142 can be even with each other and parallel to form a straight trailing edge (downstream end 160) at outlet 116. In other embodiments, trailing edges 136 and 138 do not extend to downstream end 160 of outlet 116. Instead, interlobe region 142 extends between trailing edges 136 and 138 and downstream end 160 as shown in FIGS. 4-6 of U.S. Provisional Application No. 61/599,372 described above. FIG. 6 shows one such embodiment of cooling hole 106A, with angles $\theta_1$ and $\theta_2$ between downstream end 160 and lines tangent to stationary points 163 and 165 of respective first and second lateral edges 162 and 164.

Figure 7:
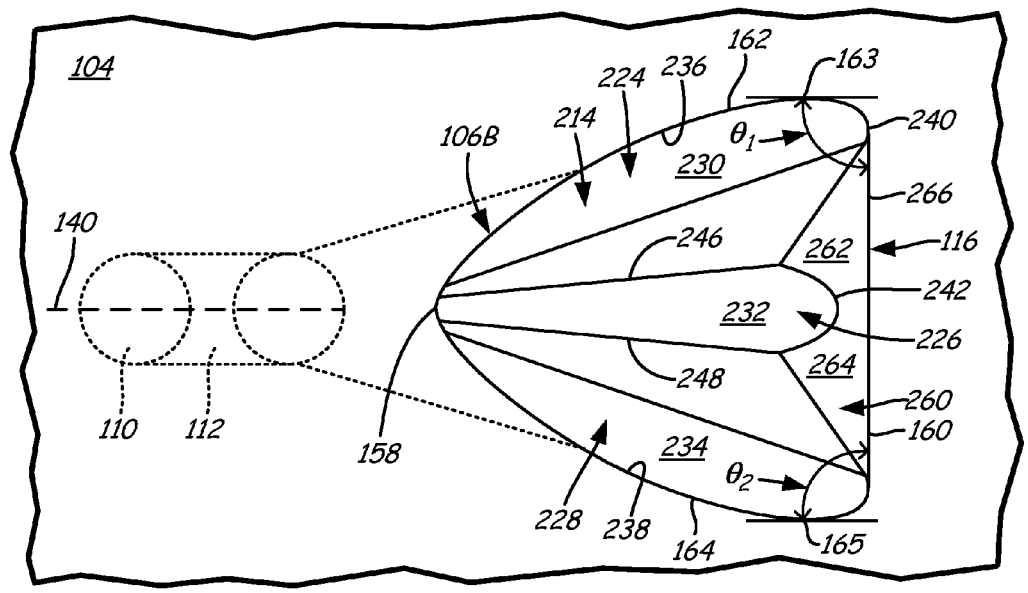
FIG. 7 is a view of another embodiment of a multi-lobed cooling hole.
Figure 8:
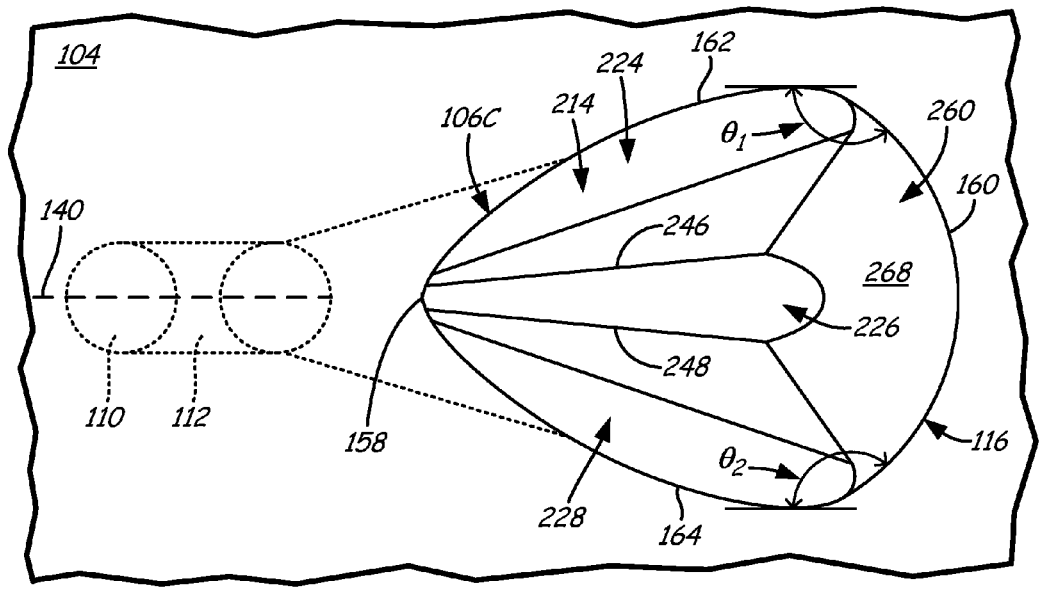
FIG. 8 is a view of another embodiment of a multi-lobed cooling hole.

In the embodiments shown in FIGS. 5 and 6, diffusing section 114 contains two lobes. In other embodiments, the cooling hole has a diffusing section with three channel-like lobes as described in U.S. Provisional Application No. 61/599,379, filed on Feb. 15, 2012 and entitled "MULTI-LOBED COOLING HOLE AND METHOD OF MANUFACTURE", which is incorporated by reference. FIGS. 7 and 8 illustrate plan views of two cooling holes (106B and 106C) having a diffusing section with three lobes. The reference numerals for cooling holes 106B and 106C have been increased by 100 relative to the accompanying description provided in U.S. Provisional Application No. 61/599,379. FIG. 7 shows one embodiment of three-lobed cooling 106B having an outlet with a straight trailing edge, with angles $\theta_1$ and $\theta_2$ between downstream end 160 and lines tangent to stationary points 163 and 165 of respective lateral edges 162 and 164. FIG. 8 shows one embodiment of three-lobed cooling 106C having a curved and concave trailing edge, with angles $\theta_1$ and $\theta_2$ between downstream end 160 and lines tangent to stationary points 163 and 165 of respective lateral edges 162 and 164. Two-lobed cooling holes 106 and 106A can also have a concave trailing edge (downstream end 160) at outlet 116.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

Discussion of Possible Embodiments

The following are non-exclusive descriptions of possible embodiments of the present invention.

A gas turbine engine component can include a wall having first and second wall surfaces and a cooling hole extending through the wall. The cooling hole can include an inlet located at the first wall surface, an outlet located at the second wall surface, a metering section extending downstream from the inlet and a diffusing section extending from the metering section to the outlet. The diffusing section can include a first lobe diverging longitudinally and laterally from the metering section, a second lobe diverging longitudinally and laterally from the metering section, an upstream end located at the outlet, a trailing edge opposite the upstream end and located at the outlet, a first sidewall having a first edge extending along the outlet between the upstream end and the trailing edge and a second sidewall having a second edge extending along the outlet between the upstream end and the trailing edge generally opposite the first sidewall. The first edge can diverge laterally from the upstream end and converge laterally before reaching the trailing edge, and the second edge can diverge laterally from the upstream end and converge laterally before reaching the trailing edge.

The system of the preceding paragraph can optionally include, additionally and/or alternatively any, one or more of the following features, configurations and/or additional components:

an angle formed between a line tangent to the first edge at its greatest lateral divergence and the trailing edge can be greater than about 75°, and an angle formed between a line tangent to the second edge at its greatest lateral divergence and the trailing edge can be greater than about 75°;

an angle formed between a line tangent to the first edge at its greatest lateral divergence and the trailing edge can be greater than about 85°, and an angle formed between a line tangent to the second edge at its greatest lateral divergence and the trailing edge can be greater than about 85°;

the first edge and the trailing edge can form a first curved portion, and the second edge and the trailing edge can form a second curved portion;

the first lobe can include a first lobe trailing edge along which the first lobe meets the outlet at the second wall surface, and the second lobe can include a second lobe trailing edge along which the second lobe meets the outlet at the second wall surface;

the first edge and the first lobe trailing edge can form a first curved portion, and the second edge and the second lobe trailing edge can form a second curved portion;

the trailing edge can be straight;

the first lobe trailing edge and the second lobe trailing edge can be parallel and even with the trailing edge of the diffusing section;

the trailing edge can be concave;

the diffusing section can further include a third lobe positioned between the first and second lobes;

the diffusing section can further include a transition region extending between the first and second lobes and extending downstream to the trailing edge;

the transition region can have a portion located between the outlet and the first and second lobes;

the diffusing section can further include a first inclined portion adjacent the first lobe and extending towards the second lobe and a second inclined portion adjacent the second lobe and extending towards the first lobe;

the first inclined portion and the second inclined portion can meet to form a ridge between the first and second lobes; and/or the component can be selected from the group consisting of blades, vanes, airfoil tips, airfoil platforms, combustors, blade outer air seals and augmentors.

A gas path wall of a component of a gas turbine engine can include first and second wall surfaces, an inlet located at the first wall surface, an outlet located at the second wall surface, a metering section commencing at the inlet and extending downstream from the inlet and a diffusing section extending from the metering section and terminating at the outlet. The outlet can include an upstream end, a trailing edge, a first lateral edge and a second lateral edge opposite the first lateral edge. The first lateral edge can extend between the upstream end and the trailing edge, diverge laterally from the upstream end and converge laterally before reaching the trailing edge. The second lateral edge can extend between the upstream end and the trailing edge, diverge laterally from the upstream end and converge laterally before reaching the trailing edge. The diffusing section can include first and second lobes, each diverging longitudinally and laterally from the metering section.

The system of the preceding paragraph can optionally include, additionally and/or alternatively any, one or more of the following features, configurations and/or additional components:

the first lobe can include a first lobe trailing edge along which the first lobe meets the trailing edge of the outlet, and the second lobe can include a second lobe trailing edge along which the second lobe meets the trailing edge of the outlet;

an angle formed between a line tangent to the first lateral edge at its greatest lateral divergence and the trailing edge can be greater than about 75°, and an angle formed between a line tangent to the second lateral edge at its greatest lateral divergence and the trailing edge can be greater than about 75°;

the first lateral edge and the trailing edge of the outlet can form a first curved portion, and the second lateral edge and the trailing edge of the outlet can form a second curved portion;

the trailing edge of the outlet can be straight;

the first lobe trailing edge and the second lobe trailing edge can be parallel and even with the trailing edge of the outlet;

the trailing edge of the outlet can be concave;

the diffusing section can further include a third lobe positioned between the first and second lobes and diverging longitudinally from the metering section;

the diffusing section can further include a transition region extending between the first and second lobes and extending downstream to the trailing edge of the outlet; and/or the component can be selected from the group consisting of blades, vanes, airfoil tips, airfoil platforms, combustors, blade outer air seals and augmentors.

The invention claimed is:

1. A gas turbine engine component comprising:
a wall having first and second opposing surfaces and defining a cooling hole, the cooling hole extending through the wall from an inlet located at the first wall surface to an outlet located at the second wall surface and having:
  a metering section extending downstream from the inlet; and
  a diffusing section extending from the metering section to the outlet and comprising:
    a first lobe diverging longitudinally and laterally from the metering section and having a trailing edge;
    a second lobe diverging longitudinally and laterally from the metering section and having a trailing edge;
    an upstream end located at the outlet;
    a downstream end generally opposite the upstream end and located at the outlet, wherein the downstream end extends in a straight and lateral direction from an end of the first lobe to an end of the second lobe, and wherein the downstream end is at least axially coextensive with the trailing edges of the first and second lobes;
    a first sidewall having a first edge extending along the outlet between the upstream end and the downstream end trailing edge, the first edge diverging laterally from the upstream end and converging laterally before reaching the downstream end; and
    a second sidewall having a second edge extending along the outlet between the upstream end and the downstream end generally opposite the first sidewall, the second edge diverging laterally from the upstream end and converging laterally before reaching the downstream end.

2. The component of claim 1, wherein an angle formed between a line tangent to the first edge at its greatest lateral divergence and the downstream end is greater than about 75°, and wherein an angle formed between a line tangent to the second edge at its greatest lateral divergence and the downstream end is greater than about 75°.

3. The component of claim 2, wherein an angle formed between a line tangent to the first edge at its greatest lateral divergence and the downstream end is greater than about 85°, and wherein an angle formed between a line tangent to the second edge at its greatest lateral divergence and the downstream end is greater than about 85°.

4. The component of claim 1, wherein the first edge and the downstream end form a first curved portion, and wherein the second edge and the downstream end form a second curved portion.

5. The component of claim 1, wherein the first lobe comprises a first lobe trailing edge along which the first lobe meets the outlet at the second wall surface, and wherein the second lobe comprises a second lobe trailing edge along which the second lobe meets the outlet at the second wall surface.

6. The component of claim 5, wherein the first edge and the first lobe trailing edge form a first curved portion, and wherein the second edge and the second lobe trailing edge form a second curved portion.

7. The component of claim 6, wherein the first lobe trailing edge and the second lobe trailing edge are parallel and even with the downstream end of the diffusing section.

8. The component of claim 1, wherein the diffusing section further comprises:
a third lobe positioned between the first and second lobes.

9. The component of claim 1, wherein the diffusing section further comprises:
a transition region extending between the first and second lobes and extending downstream to the downstream end.

10. The component of claim 9, wherein the transition region has a portion located between the outlet and the first and second lobes.

11. The component of claim 1, wherein the diffusing section further comprises:
a first inclined portion adjacent the first lobe and extending towards the second lobe; and
a second inclined portion adjacent the second lobe and extending towards the first lobe.

12. A gas turbine engine component comprising:
a wall having first and second opposing surfaces and defining a cooling hole, the cooling hole extending from an inlet located at the first wall surface to an outlet located at the second wall surface and having:
  a metering section extending downstream from the inlet; and
  a diffusing section extending from the metering section to the outlet and comprising:
    a first lobe diverging longitudinally and laterally from the metering section;
    a first inclined portion adjacent the first lobe and extending towards the second lobe;
    a second lobe diverging longitudinally and laterally from the metering section;

a second inclined portion adjacent the second lobe and extending towards the first lobe, wherein the first inclined portion and the second inclined portion meet to form a ridge between the first and second lobes;

an upstream end located at the outlet;

a trailing edge opposite the upstream end and located at the outlet;

a first sidewall having a first edge extending along the outlet between the upstream end and the trailing edge, the first edge diverging laterally from the upstream end and converging laterally before reaching the trailing edge; and a second sidewall having a second edge extending along the outlet between the upstream end and the trailing edge generally opposite the first sidewall, the second edge diverging laterally from the upstream end and converging laterally before reaching the trailing edge.

13. The component of claim 1, wherein the component is selected from the group consisting of blades, vanes, airfoil tips, airfoil platforms, combustors, blade outer air seals and augmentors.

14. A wall of a component of a gas turbine engine, the wall comprising:

first and second wall surfaces;

an inlet located at the first wall surface;

an outlet located at the second wall surface, the outlet comprising:

an upstream end;

a downstream end generally opposite the upstream end;

a first lateral edge extending between the upstream end and the downstream end, the first lateral edge diverging laterally from the upstream end and converging laterally before reaching the downstream end; and a second lateral edge opposite the first lateral edge extending between the upstream end and the downstream end, the second lateral edge diverging laterally from the upstream end and converging laterally before reaching the downstream end, wherein the downstream end extends in a straight and lateral direction from the first lateral edge to the second lateral edge;

a metering section commencing at the inlet and extending downstream from the inlet; and a diffusing section extending from the metering section and terminating at the outlet, the diffusing section comprising:

a first lobe diverging longitudinally and laterally from the metering section; and a second lobe diverging longitudinally and laterally from the metering section.

15. The wall of claim 14, wherein the first lobe comprises a first lobe trailing edge along which the first lobe meets the downstream end of the outlet, and wherein the second lobe comprises a second lobe trailing edge along which the second lobe meets the downstream end of the outlet.

16. The wall of claim 14, wherein an angle formed between a line tangent to the first lateral edge at its greatest lateral divergence and the downstream end is greater than about 75°, and wherein an angle formed between a line tangent to the second lateral edge at its greatest lateral divergence and the downstream end is greater than about 75°.

17. The wall of claim 14, wherein the first lateral edge and the downstream end of the outlet form a first curved portion, and wherein the second lateral edge and the downstream end of the outlet form a second curved portion.

18. The wall of claim 15, wherein the first lobe trailing edge and the second lobe trailing edge are parallel and even with the downstream end of the outlet.

19. The wall of claim 14, wherein the diffusing section further comprises:

a third lobe positioned between the first and second lobes.

20. The wall of claim 14, wherein the diffusing section further comprises:

a transition region extending between the first and second lobes and extending downstream to the downstream end of the outlet.

21. The wall of claim 14, wherein the component is selected from the group consisting of blades, vanes, airfoil tips, airfoil platforms, combustors, blade outer air seals and augmentors.

* * * * *